June 9, 1953 C. H. HOEPPNER 2,641,700

PULSE GROUP GENERATOR

Filed Nov. 14, 1945 2 Sheets-Sheet 1

Inventor

CONRAD H. HOEPPNER

By Ralph L. Chappell

Attorney

June 9, 1953 C. H. HOEPPNER 2,641,700

PULSE GROUP GENERATOR

Filed Nov. 14, 1945 2 Sheets-Sheet 2

Inventor

CONRAD H. HOEPPNER

By Ralph L Chappell

Attorney

Patented June 9, 1953 2,641,700

UNITED STATES PATENT OFFICE 2,641,700

PULSE GROUP GENERATOR

Conrad H. Hoeppner, Washington, D. C.

Application November 14, 1945, Serial No. 628,637

12 Claims. (Cl. 250—27)

(Granted under Title 35, U. S. Code (1952), sec. 266)

This invention relates broadly to pulse type communication circuits and in particular to a method of and means for producing pulse groups having certain definite characteristics.

In the more highly developed phases of radio communication, radio control, and radio echo ranging apparatus, timing requirements are quite severe. Advantage is frequently taken of the precision of electronic circuits to perform certain vital functions in communication, ranging and control. For example, a receiving apparatus may be carefully designed to respond only to incoming signals having distinctive durations or spacings or both. It is then a problem of supplying a transmitting apparatus which will faithfully produce a signal which has the characteristics of the signal to which the receiver is responsive. The precision of a stable sine wave oscillator makes it an ideal instrument for marking time intervals and wide use has therefore been made of it in its various forms to control transmitting equipment of the nature described above. If the signal to be transmitted and received comprises a group of pulses of uniform duration spaced in time by an interval equal to or greater than that duration, a sine wave may readily be modified by limiting and amplification to supply the desired keying waveform. If, however, the signal to be transmitted and received comprises a group of pulses of uniform duration spaced in time by an interval less than that duration, problems arise which are not so readily solved.

It is an object of this invention to provide a method of and means for producing pulse groups which comprise pulses of greater duration than spacing.

It is another object of this invention to provide a generator of pulse groups comprising pulses of greater duration than spacing wherein timing precision is equivalent to that of a stable sine wave generator.

It is another object of this invention to provide a generator of pulse groups comprising pulses of selectable duration and spacing.

Other objects and features of this invention will become apparent upon a careful consideration of the following detailed description when taken together with the accompanying drawings in which.

In general, this invention comprises generating a rectangular pulse of a predetermined duration which defines the overall duration of the pulse group to be generated. This rectangular pulse is interrupted at periodic intervals by means of spacing pulses so as to divide the rectangular pulse into a group of pulses. The spacing pulses are derived from a sine wave oscillator thus providing an accurate duration for each of the individual pulses comprising the generated group. The effect is that of amplitude modulating a rectangular pulse by means of a series of spacing pulses so as to produce a series of output pulses of accurate duration and spacing. One valuable result which is achieved by this invention is that of producing a series of output pulses in which the spacing between pulses is less than the duration of the pulses themselves. Such a configuration is not directly obtainable from a sine wave by clipping and amplifying since the individual half cycles of one polarity are separated in time by an interval of a half cycle. Such a sine wave may, however, be clipped and amplified to produce pulses which are of short duration with respect to their spacing. The uniformity of duration and spacing will be controlled only by the frequency and amplitude stability of the sine wave source which may be made quite high by proper design and construction. This invention employs the clipped and amplified sine wave pulses to modulate a separately produced rectangular pulse in such a manner that they define the spacing between the pulses of the output group and in so doing produce output pulses which are of greater duration than spacing one to the other.

Figure 1:
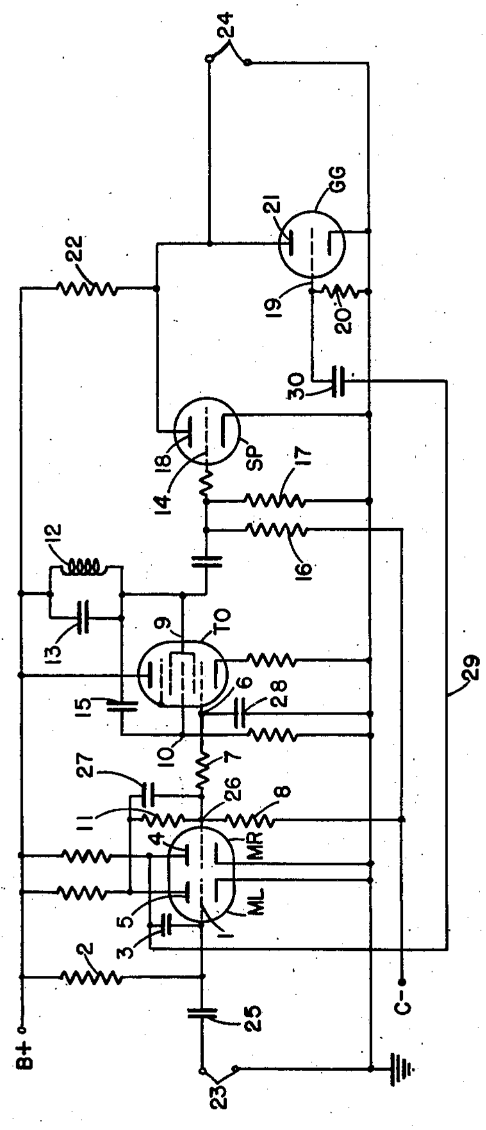
Fig. 1 is the circuit diagram of one embodiment of this invention.

In particular, Fig. 1, to which reference is now had, is the circuit diagram of one embodiment of this invention. In Fig. 1, the dual triode vacuum tube having left hand element ML and right hand element MR represents a generator of rectangular voltage pulses. In the form shown it constitutes a "delay" or "one-shot" multivibrator which has only one stable state of equilibrium (ML conducting and MR non-conducting) but which will maintain, upon receipt of a negative signal at grid 1 of ML, a second state (ML non-conducting and MR conducting) for a definite interval of time. This interval of time during which the second state of the multivibrator can be maintained is determined by the time constant circuit formed by resistance 2 and capacitor 3. As ML and MR are driven into non-conduction and conduction respectively to produce the second state of the multivibrator, plate 4 of MR is thereby driven sharply negative and capacitor 3, which is fully charged, holds grid 1 of ML below cutoff until capacitor 3 partially discharges through resistor 2. As soon as this partial discharge occurs, ML is rendered capable of conducting and the multivibrator reassumes its stable state through regenerative action. This process is accompanied at plate 4 (and hence at grid 1) by a rectangular negative pulse and at plate 5 of ML by a rectangular positive pulse. These rectangular positive and negative pulses are of the same duration which may be predetermined by proper selection of resistor 2 and capacitor 3.

Vacuum tube TO and its associated components represent a sine wave generator which, in the form shown, is frequently referred to as a transitron oscillator. Such a transitron oscillator is distinguished by the fact that it may be keyed from quiescence into operation in such a manner that the sine wave produced always starts in the same phase and reaches the same amplitude on the first positive half cycle as is maintained during continuous oscillation. The modus operandi of the transitron oscillator is well known to the art and a detailed description is therefore unnecessary. Briefly, however, TO oscillates at a frequency determined by the parallel resonant circuit connected between screen grid 9 and B+ potential comprising inductor 12 and capacitor 13. The oscillator load (grid 14 of tube SP in this case) is tapped off between the tank circuit and screen grid 9. Also tapped off at that point and run through capacitor 15 is a lead to second control grid 10. Thus, the oscillations which appear at the tap point also appear at grid 10 and advantage is taken of the negative transconductance between grid 10 and screen grid 9 to supply the power to support continuous oscillation in the parallel resonant circuit. In the quiescent condition of the circuit of Fig. 1, oscillator TO is held inoperative by virtue of the connection of first control grid 6 to C-potential through resistors 7 and 8 and to plate 5 of tube ML (which is conducting) through resistor 11. When the bias is removed from grid 6, screen grid 9 first starts on a negative excursion which develops into a pure sinusoid of constant amplitude.

Tubes SP and GG and their associated components taken together represent a means of combining the rectangular pulse generated by multivibrator ML and MR and the sine wave generated by oscillator TO in a predetermined manner. Resistor 22, which is common to the plate circuits of both tube SP and tube GG may be chosen so as to provide a resistance which is large compared to that of the tubes when either is rendered conducting at its grid. Thus, conduction by either tube SP or tube GG places upper output terminal 24 at essentially ground potential and renders variations at the grid of the other tube impotent even though the variations may carry that tube from a condition of non-conduction to a condition of full conduction. Taken by itself with its immediately associated components, tube SP comprises a clipping amplifier. It represents a convenient means of securing from the sine voltage appearing at screen 9 of TO a series of pulses shorter in duration than in spacing. The quiescent potential of grid 14 is so fixed by connection to C-potential through resistor 16 and ground potential through resistor 17 that only the most positive portions of the positive half cycles appearing at screen grid 9 of TO cause SP to conduct. Thus SP conducts for only a portion of each cycle of the sine wave generated by sine wave oscillator TO. SP may be chosen a sharp cutoff tube so that it is rapidly driven from non-conduction to full conduction by the aforesaid portion of the sine wave cycle to produce at anode 18 a narrow negative pulse. The number of such narrow negative pulses appearing at anode 18 depends, therefore, on the number of positive half cycles of full amplitude impressed on grid 14 during any interval when tube GG is held non-conducting.

Tube GG, taken by itself, represents a means of combining the pulses appearing at anode 18 of SP with the rectangular voltage generated by ML and MR in such a manner that the rectangular voltage is modulated by the anode 18 pulses and in such a manner that the anode 18 pulses appear as the spacings between the pulses into which the rectangular voltage is divided. In the quiescent condition of the circuit of Fig. 1, tube GG is held fully conducting by virtue of the connection of grid 19 to ground through resistor 20. When, however, a negative potential is impressed upon grid 19, a positive potential appears at anode 21 by virtue of the cessation of current flow through tube GG and hence through plate load resistor 22. As has been stated, plate load resistor 22 is common to both SP and GG so that, in order for conduction by SP to result in a negative excursion at anode 18 (and anode 21), GG must be cutoff. Likewise, non-conduction by GG may only result in a positive voltage at anodes 21 and 18 when SP is also non-conducting.

Figure 2:
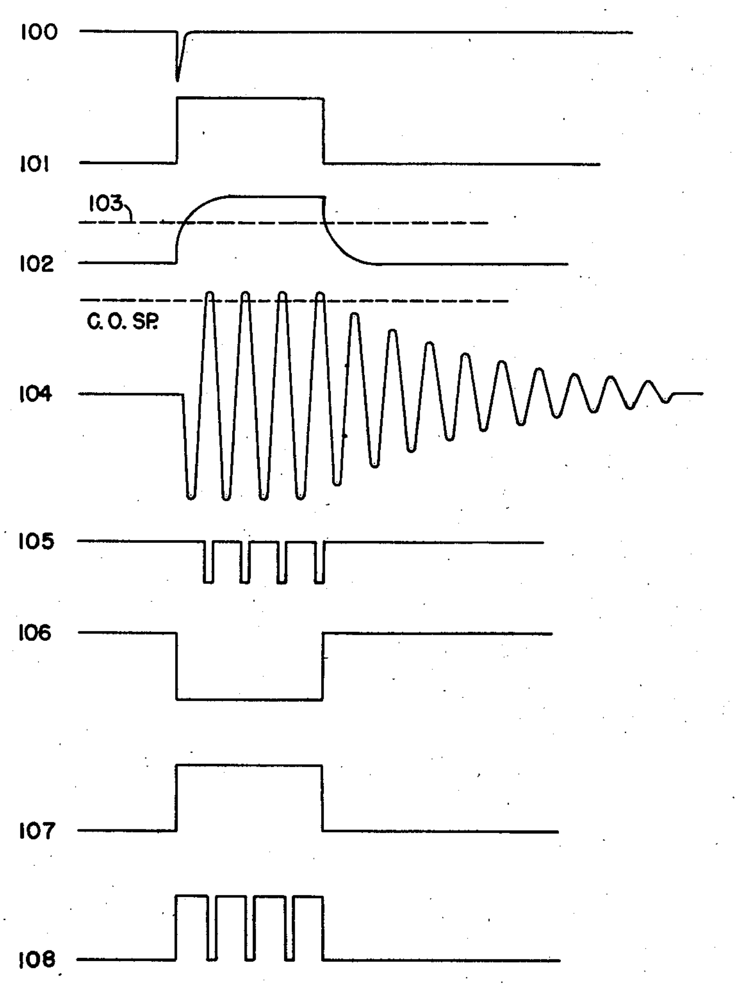
Fig. 2 is a series of waveforms useful in explaining the operation of the circuit of Fig. 1.

The combined actions of these various circuit components may be better understood by reference to the waveforms of Fig. 2 in which amplitude on the vertical axis has been plotted against time on the horizontal axis.

Waveform 100 is representative of a negative pulse triggering signal applied at input terminals 23 for the purposes of generating a definite pulse group by means of the circuit of Fig. 1. In accordance with the hereinbefore explained action of the multivibrator ML and MR, a negative keying pulse applied to grid 1 by coupling capacitor 25 causes a positive rectangular voltage to appear at plate 5 of ML which is represented by waveform 101. This rectangular voltage is coupled to grid 26 of MR through restistor 11 and capacitor 27 to render ML conducting. This positive signal is also communicated to grid 6 of tube TO through resistor 7 but the abrupt leading edge appearing at anode 5 and grid 26 is tempered by the necessity of charging capacitor 28 between grid 6 and ground. The waveform representing this action is 102. Voltage level 103 superposed on waveform 102 defines the potential to which grid 6 must be raised in order to render oscillator TO operative. It will be seen that the tempered rise of waveform 102 causes TO to be rendered operative a short interval after the leading edge of waveform 101. This action is introduced to compensate for the fact that oscillator TO does not, upon being keyed, start in the exact phase which would result in pulse width uniformity at output 24 as is hereinafter explained.

After the interval described, oscillator TO starts the generation of the sine wave represented by waveform 104. On this waveform has been superposed voltage level C. O. SP which defines the potential to which grid 14 of tube SP must be raised in order to cause conduction by that tube. It is apparent that tube SP is only rendered conducting for a portion of each cycle of the sine wave generated by TO. The pulses which would result from this conduction by SP were tube GG held quiescently non-conducting are represented by waveform 105. Reverting now to multivibrator ML and MR, waveform 106 represents the rectangular voltage appearing at anode 4 of MR and which is coupled to grid 19 of tube GG through lead 29 and capacitor 30. This rectangular voltage cuts off tube GG for the duration of that voltage to produce (but for the spacing pulses from tube SP) the positive rectangular voltage represented by waveform 107. The spacing pulses produced by tube SP from the sine wave oscillator TO serve to amplitude modulate the rectangular voltage and yield waveform 108 which appears at output terminals 24 as the desired pulse group. This pulse group may then be applied to a transmitter connected to terminals 24 (not shown) so as to key the transmitter and cause to be emitted a signal having the pulse group characteristics all in response to a single input pulse at terminals 23. Pulse duration and spacing can be made variable, by either adjustment of the C. O. SP level in waveform 104 or by adjustment of the oscillator TO frequency or both.

In this particular embodiment, it was desired that all pulses of the output group have the same duration. Examination of waveform 104 points up the fact that oscillator TO starts in such a phase as to cause the first pulse of the output group to be shorter than subsequent pulses unless the start of the sine wave generation is delayed to establish a predetermined time relation with respect to the leading edge of waveform 106. While the resistance-capacitance combination 7 and 28 of Fig. 1 is a preferred means of establishing this time relation, it may be established by other means such as another multivibrator similar to ML and MR acting to control the start of oscillator TO. Such an added multivibrator would receive the same trigger as is applied to ML and MR but would be supplied with a delay line at its input to establish the delay required.

It will be evident from the waveforms of Fig. 2 that the trailing edge of waveform 106 must occur during one of the spacing pulses produced by the sine wave oscillator in order that the last pulse of the output group be of the same duration as the preceding pulses. This may be accomplished, as in the circuit of Fig. 1, merely by proper choice of circuit elements of the rectangular voltage generator ML and MR or it may be accomplished by other means. For example, the potential of grid 1 of ML rises exponentially toward the voltage level necessary to institute the regenerative action which ends the rectangular voltage generation. The instant at which grid 1 reaches that voltage level may be determined precisely by injection of a synchronizing voltage in a known manner. The sinusoidal voltage of waveform 104 could be employed as this synchronizing medium if injected at grid 1 or the output pulse group of waveform 108 could be differentiated and injected at the cathode of ML.

Any number of pulses may be caused to appear in the pulse group simply by fixing the duration of the second state of multivibrator ML and MR. If a trigger circuit of the type having two stable states were employed in lieu of ML and MR, the pulse group generator would produce pulses continuously in response to a first input pulse until triggered back by a second input pulse.

Even though, in the embodiment shown, all pulses in the output group have the same duration, it will be apparent that the first and last pulses of each group may be given distinctive durations as may be required by a particular application. The particular means employed, viz. tubes SP and GG, to combine the rectangular voltage and the sine wave may be replaced by other means without altering the principles of this invention. For example, a multigrid tube properly biased receiving at one control grid a rectangular voltage and at the other control grid a sinusoidal voltage may be employed to produce the desired pulse group.

Since certain further changes may be made in the foregoing construction and different embodiments of the invention may be made without departing from the scope thereof, it is intended that all matter shown in the accompanying drawings, or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. A method of producing a recurrent pulse signal which comprises, generating a rectangular voltage, concurrently generating a sine wave voltage, starting in a predetermined phase, and combining the rectangular voltage wave and the peaks of one sense of said sine wave voltage to amplitude modulate the rectangular voltage wave.

2. A method of producing a recurrent pulse signal which comprises, generating a unipolar rectangular voltage, concurrently generating a sine wave voltage whose period is many times shorter than the duration of said rectangular voltage, generating unipolar pulses of a sense opposite to said rectangular voltage responsive to the peaks of one sense of said sine wave voltage, and combining said last named pulses and said rectangular voltage wave to amplitude modulate said rectangular voltage.

3. A method of producing a controlled number of voltage pulses which comprises, starting the generation of a rectangular voltage, starting the generation of a sine wave voltage in a predetermined phase and in a predetermined time relation with respect to the start of said rectangular voltage, combining said rectangular voltage and said since wave voltage so as to amplitude modulate said rectangular voltage in accordance with a portion of each cycle of said sine wave voltage, said portion being that generated during the interval in which said cycle exceeds a predetermined amplitude in one sense, stopping said generation of said rectangular voltage after a predetermined interval, and stopping said generation of said sine wave voltage.

4. A method of producing a controlled number of voltage pulses which comprises, starting the generation of a rectangular voltage, starting the generation of a sine wave voltage in a predetermined phase and in a predetermined time relation with respect to the start of said rectangular voltage, amplifying so as to produce a spacing pulse a portion of each cycle of said sine wave voltage, said portion being that generated during the interval in which said cycle exceeds a predetermined amplitude in one sense, combining said spacing pulses so produced with said rectangular voltage so as to amplitude modulate said rectangular voltage in accordance with said spacing pulses, stopping said generation of said rectangular voltage in coincidence with a selected one of said spacing pulses, and stopping said generation of said sine wave voltage.

5. Apparatus for generating a controlled number of pulses comprising, a first voltage generator operative to generate a rectangular voltage wave, a sine wave signal generator coupled to said first voltage generator and operative responsive thereto to generate concurrently with said rectangular voltage wave a sine wave voltage whose period is many times shorter than said rectangular voltage wave, amplifying means fed by said first voltage generator operative to translate the output therefrom, and means operative responsive to said sine wave voltage for periodically interrupting the amplification of said rectangular voltage wave once each cycle of said sine wave to thereby amplitude modulate said rectangular voltage wave.

6. A means for producing voltage pulses which comprises, means generating a rectangular voltage, a sine wave oscillator fed by said rectangular voltage operative responsive thereto to generate a sine wave voltage whose period is many times shorter than the duration of said rectangular voltage, and combining means connected to receive said sine wave voltage and said rectangular voltage for amplitude modulating said rectangular voltage in accordance with a portion of each cycle of said sine wave voltage, said portion being that generated during the interval in which said cycle exceeds a predetermined amplitude of one sense.

7 A means for producing groups of voltage pulses which comprises, means generating a rectangular voltage pulse in response to an applied pulse, means generating a sine wave voltage which starts in a predetermined phase, and means combining said rectangular voltage pulse and said sine wave voltage so as to amplitude modulate said rectangular voltage pulse in accordance with a portion of each cycle of said sine wave voltage.

8. A means for producing groups of voltage pulses which comprises, means generating a rectangular voltage pulse in response to an applied pulse, means generating a sine wave voltage which starts in a predetermined phase, and means combining said rectangular voltage pulse and said sine wave voltage so as to amplitude modulate said rectangular voltage pulse in accordance with a portion of each cycle of said sine wave voltage, said portion being that generated during the interval in which said cycle exceeds a predetermined amplitude.

9. A means for producing groups of voltage pulses which comprises, means generating a rectangular voltage pulse in response to an applied pulse, means generating a sine wave voltage which starts in a predetermined phase and in a predetermined time relation with respect to the leading edge of said rectangular voltage pulse, and means combining said rectangular voltage pulse and said sine wave voltage so as to amplitude modulate said rectangular voltage pulse in accordance with a portion of each cycle of said sine wave voltage, said portion being that generated during the interval in which said cycle exceeds a predetermined amplitude.

10. A means for producing groups of voltage pulses which comprises, means generating a rectangular voltage pulse in response to an applied pulse, means generating a sine wave voltage which starts in a predetermined phase and in a predetermined time relation with respect to the leading edge of said rectangular voltage pulse, means amplifying so as to produce a spacing pulse a portion of each cycle of said sine wave voltage, said portion being that generated during the interval in which said cycle exceeds a predetermined amplitude, and means combining said spacing pulses so produced with said rectangular voltage pulse so as to amplitude modulate said rectangular voltage pulse in accordance with said spacing pulses.

11. A means for producing groups of voltage pulses which comprises means generating a rectangular voltage pulse in response to an applied pulse, means generating a sine wave voltage, means starting said sine wave voltage generating means at a predetermined point in its cycle of operation and in a predetermined time relation with respect to the leading edge of said rectangular voltage pulse and stopping said sine wave voltage generating means in a predetermined time relation with respect to the trailing edge of said rectangular voltage pulse, means amplifying so as to produce a spacing pulse a portion of each cycle of said sine wave voltage, said portion being that generated during the interval in which said cycle exceeds a predetermined amplitude, and means combining said spacing pulses so produced with said rectangular voltage pulse so as to amplitude modulate said rectangular voltage pulse in accordance with said spacing pulses.

12. A means for producing groups of voltage pulses which comprises multivibrator means generating a rectangular voltage pulse in response to an applied pulse, oscillator means generating a sine wave voltage, resistance capacitance means connecting said multivibrator and said oscillator and starting said oscillator at a predetermined point in its cycle of operation and in a predetermined time relation with respect to the leading edge of said rectangular voltage pulse and stopping said oscillator in a predetermined time relation with respect to the trailing edge of said rectangular voltage pulse, amplifier means connected to said oscillator and producing a spacing pulse in response to a portion of each cycle of said sine wave voltage, said portion being that generated during the interval in which said cycle exceeds a predetermined amplitude, and a vacuum tube means connecting said multivibrator and said amplifier and combining said spacing pulses so produced with said rectangular voltage pulse so as to amplitude modulate said rectangular voltage pulse in accordance with said spacing pulses.

CONRAD H. HOEPPNER.

References Cited in the file of this patent

UNITED STATES PATENTS

| Number | Name | Date |
|---|---|---|
| 2,055,883 | Terry | Sept. 29, 1936 |
| 2,226,459 | Bingley | Dec. 24, 1940 |
| 2,338,395 | Bartelink | Jan. 4, 1944 |
| 2,403,918 | Grosdoff | July 16, 1946 |
| 2,419,292 | Shepard | Apr. 22, 1947 |